(12) United States Patent
Chakaravarthy et al.

(10) Patent No.: US 11,178,257 B1
(45) Date of Patent: Nov. 16, 2021

(54) INCARNATION SELECTION FOR APPLICATION HOSTING ON REMOTE SERVICES ENVIRONMENT

(71) Applicant: International Business Machines Corporation, Armonk, NY (US)

(72) Inventors: Venkatesan T. Chakaravarthy, Munirka (IN); Ashok Pon Kumar Sree Prakash, Bangalore (IN); Padmanabha Venkatagiri Seshadri, Mysore (IN); Amith Singhee, Bangalore (IN); Yogish Sabharwal, Gurgaon (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/067,907

(22) Filed: Oct. 12, 2020

(51) Int. Cl.
*H04L 12/24* (2006.01)
*H04L 12/911* (2013.01)
(Continued)

(52) U.S. Cl.
CPC .......... *H04L 67/42* (2013.01); *H04L 67/1002* (2013.01); *H04L 67/16* (2013.01); *H04L 67/30* (2013.01)

(58) Field of Classification Search
CPC ..... H04L 67/42; H04L 67/1002; H04L 67/16; H04L 67/30
See application file for complete search history.

(56) References Cited

U.S. PATENT DOCUMENTS 7,464,147 B1  12/2008  Fakhouri et al.
8,423,998 B2   4/2013  Isci et al.
(Continued)

FOREIGN PATENT DOCUMENTS

CN        107743100 B  * 11/2020
WO     WO2019011262 A1    1/2019

OTHER PUBLICATIONS

Timothy Zhu et al., "WorkloadCompactor: Reducing datacenter cost while providing tail latency SLO guarantees", SoCC '17, Sep. 25-27, 2017, Santa Clara, CA, USA, 13 pages, ACM Digital Library.
(Continued)

*Primary Examiner* — Christopher B Robinson
(74) *Attorney, Agent, or Firm* — Ference & Associates LLC

(57) ABSTRACT

One embodiment provides a computer implemented method, including: receiving an application including a plurality of services to be hosted on a remote services environment; obtaining, a resource profile identifying a usage of a resource by a given service of the plurality of services over a period of time; splitting, based upon the resource profile corresponding to a given service, the given service into a plurality of service slices; selecting, for each of the plurality of service slices an incarnation fulfilling a resource demand requirement and a service-performance-offering, wherein an incarnation has a total demand value based upon a resource capacity of a node at the remote services environment; and assigning, for each of the plurality of service slices the incarnation selected to at least one node within the remote services environment based upon the resource capacity of the at least one node.

20 Claims, 5 Drawing Sheets

(51) Int. Cl.
　　　*H04L 29/06*　　　(2006.01)
　　　*H04L 29/08*　　　(2006.01)

(56) References Cited

U.S. PATENT DOCUMENTS

| | | | |
|---|---|---|---|
| 9,602,573 | B1 | 3/2017 | Abu-Ghazaleh et al. |
| 9,766,945 | B2 | 9/2017 | Gaurav et al. |
| 10,067,801 | B1 | 9/2018 | Wagner |
| 10,191,778 | B1 | 1/2019 | Yang et al. |
| 2006/0235664 | A1 | 10/2006 | Vinberg et al. |
| 2008/0222154 | A1* | 9/2008 | Harrington ......... G06F 16/1834 |
| 2014/0019965 | A1 | 1/2014 | Neuse et al. |
| 2014/0164594 | A1 | 6/2014 | Crowell et al. |
| 2015/0312422 | A1* | 10/2015 | Leemet ............... G06Q 20/384 455/406 |
| 2017/0054595 | A1* | 2/2017 | Zhang ..................... H04L 41/12 |
| 2017/0135099 | A1* | 5/2017 | Song ..................... H04W 16/02 |
| 2017/0201597 | A1 | 7/2017 | Narasimhan et al. |
| 2017/0206591 | A1* | 7/2017 | Deshpande ........ G06Q 30/0284 |
| 2018/0139107 | A1* | 5/2018 | Senarath ............ H04L 41/5067 |
| 2019/0028249 | A1* | 1/2019 | Rost ...................... H04L 5/0037 |
| 2019/0286486 | A1* | 9/2019 | Ma ........................... G06N 20/00 |
| 2020/0073717 | A1 | 3/2020 | Hari |

OTHER PUBLICATIONS

Sevil Draxler et al., "Joint Optimization of Scaling and Placement of Virtual Network Services", 17th IEEE/ACM International Symposium on Cluster, Cloud and Grid Computing, 2017, 7 pages, IEEE Digital Library.

Shay Horovitz et al., "Efficient Cloud Auto-Scaling with SLA objective using Q-Learning", IEEE 6th International Conference on Future Internet of Things and Cloud, 2018, 8 pages, IEEE Digital Library.

Mahmoud Imdoukh et al., "Machine learning-based auto-scaling for containerized applications", Neural Computing and Applications, 2020, 16 pages, Springer.

Shripad Nadgowda et al., "Paracloud: Bringing Application Insight into Cloud Operations", 9th USENIX Workshop on Hot Topics in Cloud Computing, 2017, 8 pages, Copy available at: https://www.usenix.org/system/files/conference/hotcloud17/hotcloud17-paper-nadgowda.pdf.

Rebecca Taft et al., "STeP: Scalable Tenant Placement for Managing Database-as-a-Service Deployments" SoCC 16, Oct. 5-7, 2016, Santa Clara, CA, USA, 13 pages, ACM Digital Library.

Sareh Fotuhi Piraghaj et al., "A Framework and Algorithm for Energy Efficient Container Consolidation in Cloud Data Centers", IEEE International Conference on Data Science and Data Intensive Systems, Dec. 2015, 9 pages, ResearchGate.

Liang Lv et al., "Communication-Aware Container Placement and Reassignment in Large-Scale Internet Data Centers", IEEE Journal on Selected Areas in Communications, Mar. 2019, 16 pages, vol. 37, No. 3, IEEE Digital Library.

Ying Mao et al., "DRAPS: Dynamic and Resource-Aware Placement Scheme for Docker Containers in a Heterogeneous Cluster", 2017 IEEE 36th International Performance Computing and Communications Conference, May 22, 2018, 8 pages, arXiv:1805.08598v1 [cs.DC]. IEEE Digital Library.

Saurav Nanda et al., "RACC: Resource-Aware Container Consolidation using a Deep Learning Approach", MLCS 18, Jun. 12, 2018, Tempe, AZ, USA, 5 pages, ACM Digital Library.

Rina Panigrahy et al., "Heuristics for Vector Bin Packing", 2011, 14 pages, Copy available at: https://www.microsoft.com/en-us/research/wp-content/uploads/2011/01/VBPackingESA11.pdf.

Michael Gabay et al., "Vector bin packing with heterogeneous bins: application to the machine reassignment problem", Annals of Operations Research, 2016, 34 pages, CrossMark, Springer Science+Business Media, New York, USA.

Pedro Silva et al., "Efficient Heuristics for Placing Large-Scale Distributed Applications on Multiple Clouds", CCGrid 2016, 16th IEEE/ACM International Symposium on Cluster, Cloud and Grid Computing, May 2016, Cartagena, Colombia, 11 pages, HAL.

Hal A. Kierstead, "Coloring Graphs On-line", In Book—Online Algorithms: The state of the Art, LNCS 1442, Aug. 12, 1998, 25 pages, A. Fiat and G. J. Woeginger, editors, Springer-Verlag, Berlin, Germany.

Udo Adamy et al., "Online Coloring of Intervals with Bandwidth", WAOA 2003, International Workshop on Approximation and Online Algorithms, 2004, 11 pages, Springer-Verlag Berlin Heidelberg.

Chandra Chekuri et al., "On Multi-dimensional Packing Problems", SIAM Journal on Computing, Jan. 1, 2004, 22 pages, vol. 33, Issue 4, ScholarlyCommons.

Boaz Patt-Shamir et al., "Vector bin packing with multiple-choice", Discrete Applied Mathematics, 2012, 10 pages, Elsevier.

E.G. Coffman, Jr. et al., "Approximation Algorithms for Bin Packing: A Survey", Approximation Algorithms for NP-hard Problems, Aug. 1996, 56 pages.

\* cited by examiner

- Capacity of Node-Type: [16 cores, 512 GB, 1 TB]
- TPS Demand: 3000

| Service-A | Demand | TPS-Offered |
|---|---|---|
| Inc-1 | [1 core, 128 GB, 128 GB] | 500 |
| Inc-2 | [4 cores, 128 GB, 128 GB] | 1000 |
| Inc-3 | [8 cores, 512 GB, 128 GB] | 1500 |

| Service-A | Agg-demand | Num copies | Total demand |
|---|---|---|---|
| Inc-1 | 1/16 + 1/4 + 1/8 = 7/16 | 6 | 21/8 |
| Inc-2 | 1/4 + 1/4 + 1/8 = 5/8 | 3 | 15/8 |
| Inc-3 | 1/2 + 1 + 1/8 = 13/8 | 2 | 26/8 |

FIG. 3

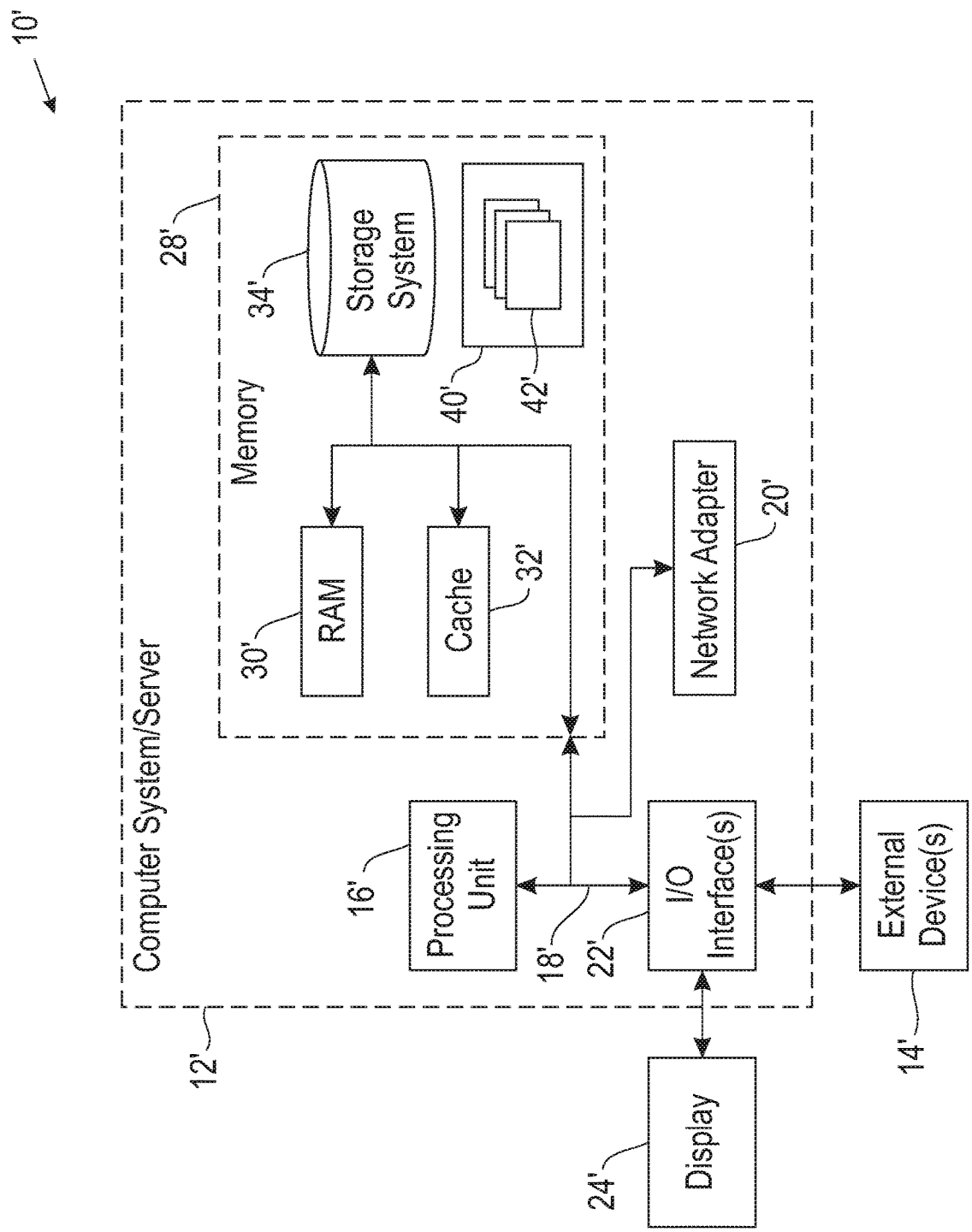

INCARNATION SELECTION FOR APPLICATION HOSTING ON REMOTE SERVICES ENVIRONMENT

BACKGROUND

With the increase in remote computing or services environments, for example, remote network environments, cloud computing environments, and the like, more users and entities are moving the hosting of applications and other services to the remote services environment. By moving the hosting of applications and other services to the remote services environment, the users and other entities are able to reduce the use of internal resources (e.g., infrastructure, computing resources, human resources, etc.) and reduce other costs associated with the application and other services. Additionally, since the remote services environment usually has significantly more resources, particularly, computing resources, than the user or entity has locally, the user or entity is able to scale the application that is being hosted on the remote services environment.

BRIEF SUMMARY

In summary, one aspect of the invention provides a computer implemented method, including: receiving an application including a plurality of services to be hosted on a remote services environment; obtaining a resource profile identifying a usage of a resource by a given service of the plurality of services over a period of time; splitting, based upon the resource profile corresponding to a given service, the given service into a plurality of service slices; selecting, for each of the plurality of service slices, an incarnation fulfilling a resource demand requirement and a service-performance-offering, wherein an incarnation has a total demand value based upon a resource capacity of a node at the remote services environment; and assigning, for each of the plurality of service slices, the incarnation selected to at least one node within the remote services environment based upon the resource capacity of the at least one node.

Another aspect of the invention provides an apparatus, including: at least one processor; and a computer readable storage medium having computer readable program code embodied therewith and executable by the at least one processor; wherein the computer readable program code is configured to receive an application including a plurality of services to be hosted on a remote services environment; wherein the computer readable program code is configured to obtain, a resource profile identifying a usage of a resource by a given service of the plurality of services over a period of time; wherein the computer readable program code is configured to split, based upon the resource profile corresponding to a given service, the given service into a plurality of service slices; wherein the computer readable program code is configured to select, for each of the plurality of service slices an incarnation fulfilling a resource demand requirement and a service-performance-offering, wherein an incarnation has a total demand value based upon a resource capacity of a node at the remote services environment; and wherein the computer readable program code is configured to assign, for each of the plurality of service slices the incarnation selected to at least one node within the remote services environment based upon the resource capacity of the at least one node.

An additional aspect of the invention provides a computer program product, including: a computer readable storage medium having computer readable program code embodied therewith, the computer readable program code executable by a processor; wherein the computer readable program code is configured to receive an application including a plurality of services to be hosted on a remote services environment; wherein the computer readable program code is configured to obtain, a resource profile identifying a usage of a resource by a given service of the plurality of services over a period of time; wherein the computer readable program code is configured to split, based upon the resource profile corresponding to a given service, the given service into a plurality of service slices; wherein the computer readable program code is configured to select, for each of the plurality of service slices an incarnation fulfilling a resource demand requirement and a service-performance-offering, wherein an incarnation has a total demand value based upon a resource capacity of a node at the remote services environment; and wherein the computer readable program code is configured to assign, for each of the plurality of service slices the incarnation selected to at least one node within the remote services environment based upon the resource capacity of the at least one node.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 3 illustrates an example identifying possible incarnations and selecting an incarnation for service slices.

FIG. 5 illustrates a computer system.

DETAILED DESCRIPTION

Figure 1:
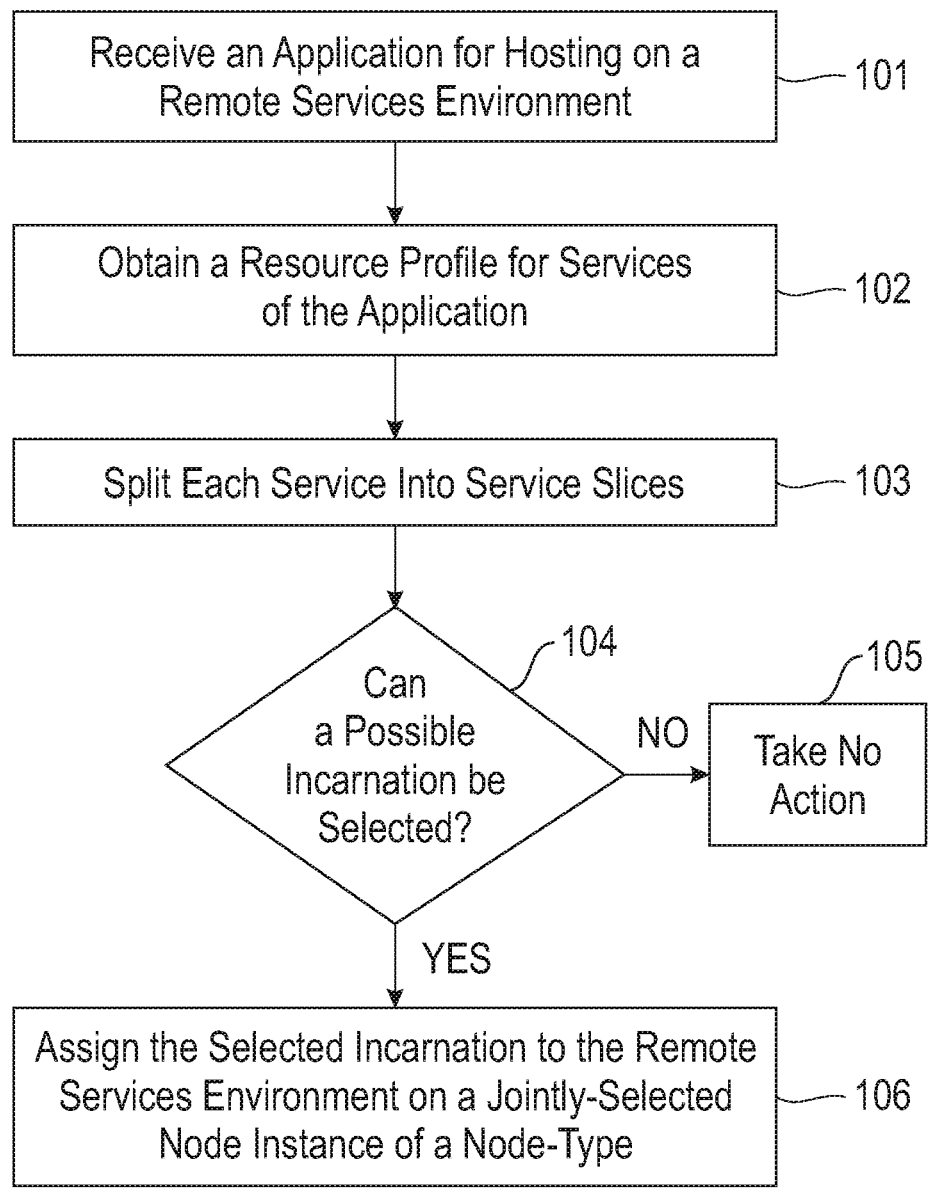
FIG. 1 illustrates a method of selecting at least one incarnation for services of an application for hosting the application on a remote services environment.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-4 can be performed or utilized by way of a processing unit or units and system memory such as those indicated, respectively, at 16' and 28' in FIG. 5, whether on a server computer, a client computer, a node computer in a distributed network, or any combination thereof.

When moving an application or services of an application to be hosted on a remote services environment, the user or entity moving the application or services has to pay for the hosting. Generally, the application entity purchases a set of nodes on the hosting entity for the application or services. This set of nodes is generally referred to as a cluster. The cluster needs to have enough resources to execute the application and deliver the desired performance. However, the application entity prefers to minimize the cost of the cluster by purchasing the fewest number of nodes or purchasing nodes that may have lower performance capabilities. If the application entity purchases too few nodes or nodes having too low of performance capabilities to run the application, then the application entity will violate service level agreements that the application entity has with customers. These violations lead to costs to the business in either payments to unhappy customers or lost revenue. On the other hand, if the application entity purchases too many nodes or nodes having extra performance capabilities, then the application entity ends up paying more for the services of the remote services environment than is necessary.

One problem with estimating the correct number of nodes is that applications or services of application generally having resource usage values that vary over a period of time. For example, an application may see an increase in transactions per second (TPS) at peak hours and a decrease in TPS during off hours. Thus, the application does not need the same amount of resources all the time. Thus, if the node performance or capacity value is chosen based upon an average resource usage, the nodes will be unable to handle the peak performance demands. One conventional technique has been to monitor the resource usage of the application or service once the application or service has been moved to the remote services environment. The problem with this technique is that, at this point, the application or service has already been moved to the remote services environment which means the nodes have already been purchased. Even if after some time the system of the conventional technique determines that fewer nodes are needed, the application entity has already been paying for the use of the extra nodes for a period of time, resulting in an unnecessary increased cost to the application entity.

Accordingly, an embodiment provides a system and method for selecting at least one incarnation for services of an application for hosting the application on a remote services environment. The system receives an application that includes a plurality of services that are to be hosted on a remote services environment (e.g., remote network environment, cloud environment, etc.). For ease of readability a cloud environment will be the primary example used here throughout of a remote services environment. However, this is not intended to limit the scope of this application in any way. For each of the services of the application obtains a resource profile that identifies a usage of a resource (e.g., transactions per second (TPS), memory, database accesses, etc.) over a period of time. For ease of readability, the primary resource example will be TPS. However, this is not intended to limit the scope of this application in any way.

Using the resource profile the system splits each of the services into service slices. These service slices represent where the resource usage was uniform during an interval. In other words, the system is determining intervals for when a service has a consistent resource demand value. The system treats each of the service slices as an individual service for the purpose of selecting an incarnation. Thus, based upon the service slices the system generates a plurality of incarnations that can fulfill the resource demand value of each of the service slices. The incarnations are based upon a resource capacity of a purchasable node at the remote services environment. Based upon resource capacities of different nodes, the system is able to identify multiple incarnations or node sets that will fulfill the resource demand requirement of the service slice.

Once an incarnation is selected, for example, based upon the incarnation having the lowest total demand value, the system assigns the incarnation to nodes on the remote services environment. The assignment is based upon identifying a node having the identified resource capacity and one that is big enough for the service slice. Once the assignment has been performed for all service slices of all services, the application can be moved to the remote services environment by scheduling the application jobs to run on the remote services environment.

Such a system provides a technical improvement over current systems for migrating applications to a remote services environment. The described system and method can identify an accurate number of nodes or cluster that is needed to run an application with the desired performance before the application is migrated to the remote services environment. By determining the correct number of nodes and necessary node performance values before moving the application to the remote services environment, the described system is providing a large technical improvement to the field of remote service environments over the conventional systems which, at best, can only make a determination after the application has been moved to the remote services environment. Additionally, making the determination before moving the application or service to the remote services environment allows the application entity to be sure that enough nodes are being purchased in order to meet service level agreements with customers while minimizing the cost of the cluster by not over purchasing nodes.

FIG. 1 illustrates a method for selecting at least one incarnation for services of an application for hosting the application on a remote services environment. At 101 the system receives an application that includes a plurality of services that is to be hosted on the remote services environment. The application may be an application that the application entity (i.e., the entity that owns, created, or otherwise controls the application) would like to move or migrate to be hosted on the cloud services environment. The application may be made of or include different services, where each service could be run independently of other services within the application. In other words, each service within the application could be run on a different portion of the cloud services environment without affecting the performance of the application. However, all services are necessary for the entire application to run correctly and perform the intended function of the application.

Accordingly, receiving the application may be receiving any indication from an application entity regarding the desire to move an application to the cloud services environment. For example, receiving the application may include a user or the application entity providing a link corresponding to the application to the system, uploading the application to the system, or the like. Additionally, if the described system is a part of the cloud services environment, receiving the application may include receiving the application at the cloud services environment. The system may then perform the described method upon receiving the application at the cloud services environment. In other words, receiving the application may be performed via any technique for receiving, accessing, or otherwise obtaining the application or information that allows for the application or services of the application to be accessed.

At 102 the system obtains a resource profile for each of the services within the application. The resource profile identifies a usage of a resource by the service over a period of time. The resource profile that is obtained is a profile for a resource of interest. Generally the chosen resource is one that affects the performance of the application or is a resource that is of interest to a customer of the application entity. For example, the application entity may have service level agreements with customers that require the application entity to provide some base level of performance. In order to meet this base level of performance, the application entity may be interested in a resource that is directly related to meeting the base level performance. Since an application entity may be interested in more than one resource, the system may obtain more than one resource profile, each for different resources. Some example resources include transactions per second (TPS), memory use, database accesses, or the like. The primary example used here throughout will be TPS.

Obtaining the resource profile may be accomplished via any one or more of a variety of techniques. One technique for obtaining the resource profile is by running the service and monitoring the resource usage of the service over a period of time, for example, a day, a week, a couple of hours, or the like. Another technique for obtaining the resource profile is to receive the resource profile from a user or other entity that has already generated the resource profile. The resource profile may also be obtained by identifying a service that is similar to the target service and that already has a resource profile and utilizing the resource profile of the similar service for the target service.

At 103 the system splits each service into a plurality of service slices. To perform the splitting, the system takes the resource profile obtained at 102 and discretizes the profile. In other words, the system represents the profile as discrete quantities so that the profile now has discrete values for different intervals. The system then slices the discretized profile into service slices. Each of the service slices represents a consistent or uniform demand over an interval, for example, a time interval, a start and end interval of demand, or the like. Each of the service slices is treated as an independent service for the selection of an incarnation. In other words, the system is able to take each service slice and determine when a resource should be allocated and the resource de-allocated for that service slice.

Figure 2:
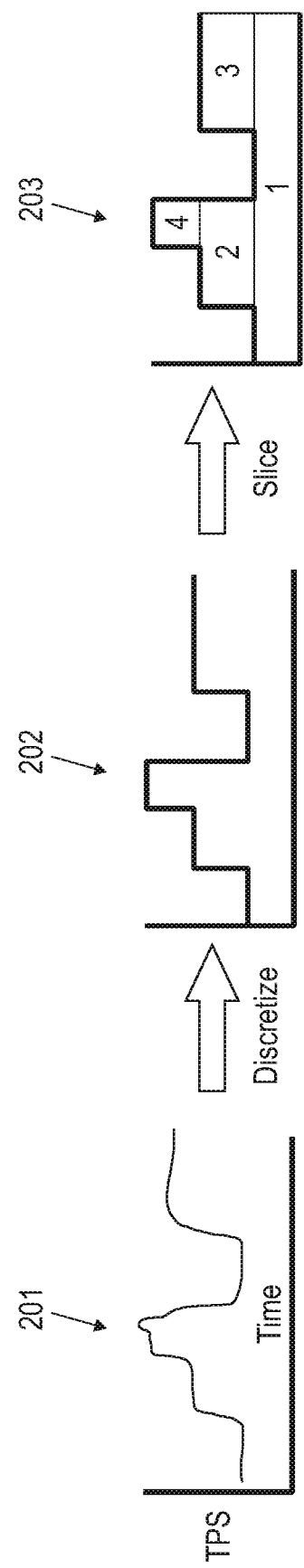
FIG. 2 illustrates an example of splitting a service into service slices.

An example of splitting a service into service slices is represented in FIG. 2. The original profile is represented at 201. The system then discretizes the profile. This discretized profile is represented at 202. As shown in the graph of 202, the discretizing results in discrete values for intervals that encompass the actual profile values at the same interval. The system then slices the discretized graph into different slices that represents a uniform demand of the resource for an interval, for example, a time interval. The sliced graph is illustrated at 203 and includes four different slices, 1, 2, 3, and 4. As can be seen, each slice is a uniform demand for an interval within the graph.

At 104 the system determines if a possible incarnation can be selected for each of the service slices for each of the services. An incarnation is based upon a resource capacity of a node at the remote services environment. A purchasable node may have different resource capacities. For example, the node may have a number of cores, amount of associated memory, a storage capacity, a resource value (e.g., TPS offered by the node, etc.), and the like. Since different purchasable nodes have different resource capacities and capabilities, there are many different alternatives that would result in a node set that would fulfill the requirements of the service slice. Each of these different alternatives is referred to as an incarnation. For example, one incarnation may include three nodes having a particular resource capacity while another incarnation may include two nodes having a different resource capacity.

Thus, to identify possible incarnations the system must determine how many nodes having particular resource capacities would be needed to fulfill the resource needs of a service slice. For ease in understanding the process, single node types will be used as an example. However, multiple node types can also be utilized and will be discussed in more detail below. The total number of nodes required is also referred to as the total demand of the incarnation. To make the determination of the total demand of the incarnation the system performs a correlative analysis between the resource capacity of the nodes and the resource demand of the incarnation.

An example analysis is illustrated in FIG. 3. The capacity of the particular node type is 16 cores, 512 GB memory capacity, and 1 TB hard drive capacity. The TPS demand of the service slice is 3000. The different incarnations illustrated in the left table identify the resource demand of each incarnation. The right table illustrates the aggregate demand of the incarnation which is based upon the demand of the incarnation in view of the resource capacity of the node type. The number of copies, also referred to as replicas, is based upon the TPS demand of the incarnation in view of the TPS demand of the service slice. For example, incarnation 1 provides 500 TPS, whereas the TPS demand of the service slice is 3000 TPS. Thus, the number of required replicas is 6 (i.e., 3000/500). The total demand can then be computed by multiplying the aggregate demand by the required number of replicas.

If different resources or resource values, also referred to as dimensions, are of interest, the dimensions can be weighted in the total demand computation. For example, if an application entity is more interested in one resource over another, the resource can have a higher weighting during the computation. Additionally, incarnations may be mixed, meaning that any two incarnations may be associated with different node types. In the case of multiple node types, a technique similar to the single node types may be utilized. A node type refers to the resource capacities, hardware/software configuration (e.g., operating systems, chipset, memory technology, etc.) of the node. In other words, if a node has a different resource capacity than a different node, these nodes are of different node types. For example, if one node has 16 cores and another node has 8 cores, these nodes are of different node types.

In the case of multiple node types, each node type will be treated separately and the above described single node type computation will be utilized. Once that node type total demand computation has been performed, the next node type computation can be performed. For each of the node types, the system identifies a cost of placing the incarnation in that particular node type. The system also identifies a profit of the node type. The profit may represent the sum of the resource demand across the number of replicas assigned to the node type. From the profit and the cost, the system determines an effectiveness of a particular node type. The effectiveness may be computed by dividing the profit by the cost. The node type selected for assigning a particular incarnation may be the node type having the greatest effectiveness value.

Once the total demands for each of the incarnations are determined, the system may select an incarnation for each of the service slices. The selected incarnation may be the incarnation having the lowest total demand value. The selected incarnation may also be the incarnation having the lowest total cost to the application entity. Since each node type has an associated cost, selecting different incarnations may result in different costs to the application entity. This may be particularly noticeable when utilizing multiple node types within a single incarnation. Thus, the selected incarnation may be the incarnation that is the cheapest while still meeting the resource demand requirements.

If an incarnation cannot be selected at 104, the system may take no action at 105. An incarnation may not be able to be selected in the event that there are no nodes that can fulfill the resource demand requirements. The system may also notify the user or application entity that an incarnation cannot be selected. If, on the other hand, an incarnation can be selected at 104, the system may assign the selected incarnation to a node within the remote services environment. In other words, once the incarnation is selected, the system can assign the service slice into the node corresponding to the incarnation.

To assign the incarnation the system may sort the replicas for the incarnation based upon a start time of each replica. The sorting may be performed in ascending order of start time. The system may then assign the first replica (i.e., the replica starting first) into a node of the cloud environment. The system then takes the next or subsequent replica and determines if it can fit in the same node. If it can fit in the same node, then the replica is assigned to the same node. If it cannot fit in the same node, then the system opens a new node and assigns the replica to the new open node. This process iteratively continues until all of the replicas have been assigned to a node. This process is also completed for all service slices and all services of the application.

To make a more efficient assignment, for subsequent replicas, the system may first determine if the subsequent replica can fit in the most filled node. If it does not fit in the most filled node, the system may determine if it will fit in the next most filled node. The system may continue this process until the system finds a node that the replica will fit within, even if that ends up being a new node. In the case of multiple node type assignments, the system assigns the incarnation to a node type matching the incarnation.

Figure 4:
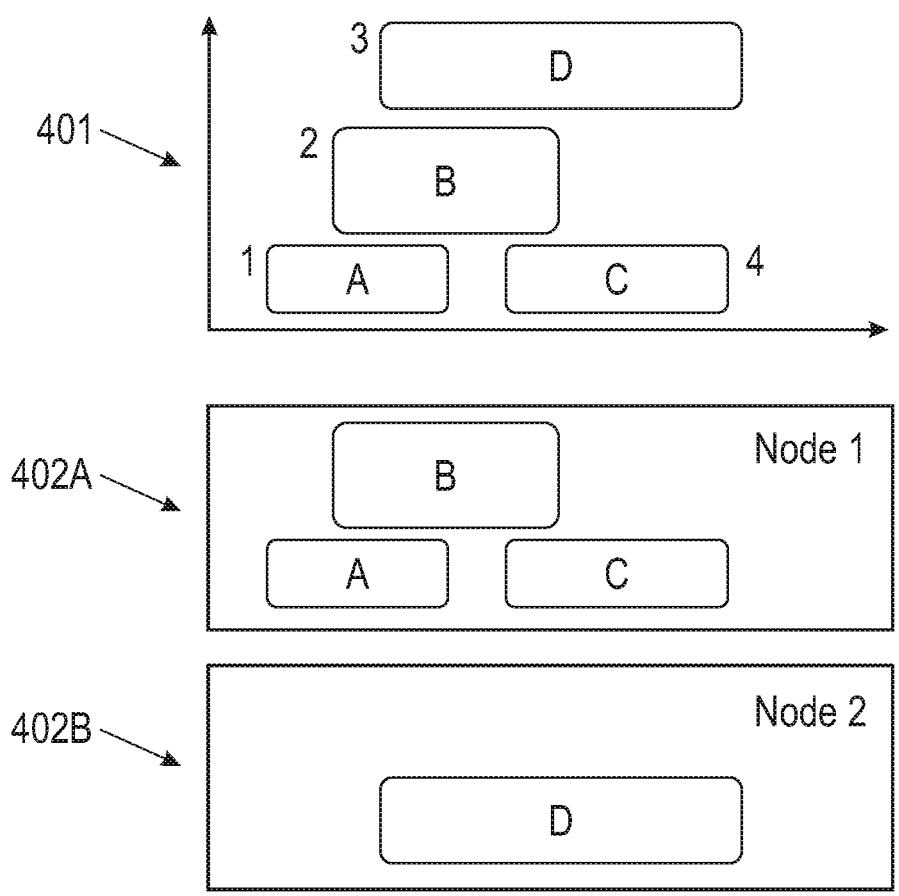
FIG. 4 illustrates an example of fitting service slices into nodes of a remote services environment.

An example assignment illustration is shown in FIG. 4. 401 illustrates the incarnations selected. Upon performing the analysis, the system determined that incarnations A, B, and C can fit in Node 1 402A and incarnation D can fit in Node 2 402B. The assignment may also include scheduling the incarnations for running on the nodes of the cloud services environment. In other words, the system creates the node cluster and schedules the jobs, effectively migrating or moving the application to the cloud services environment.

As shown in FIG. 5, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method, comprising:
receiving an application comprising a plurality of services to be hosted on a remote services environment;
obtaining, for each of the plurality of services, a resource profile identifying a usage of a resource by a given service of the plurality of services over a period of time;
splitting, based upon the resource profile corresponding to a given service, the given service into a plurality of service slices, wherein the splitting comprises discretizing the resource profile and splitting the discretized resource profile into the plurality of service slices;
selecting, for each of the plurality of service slices, an incarnation of the resource services environment fulfilling a resource demand requirement and a service-performance-offering for a given of the plurality of service slices, wherein an incarnation has a total demand value based upon a resource capacity of a node at the remote services environment, wherein the selecting comprises identifying alternative incarnations fulfilling the resource demand requirement and the service-performance-offering and selecting one of the alternative incarnations based upon at least one attribute of the alternative incarnations; and
assigning, for each of the plurality of service slices the incarnation selected to at least one node within the remote services environment based upon the resource capacity of the at least one node.

2. The method of claim 1, wherein the selecting comprises generating, for each of the plurality of service slices a plurality of possible incarnations, each of the plurality of possible incarnations fulfilling the resource demand requirement.

3. The method of claim 2, wherein each of the plurality of possible incarnations has a corresponding total demand value and wherein the incarnation selected comprises an incarnation from the plurality of possible incarnations having a lowest total demand value.

4. The method of claim 1, wherein the total demand value is based upon a number of replicas of the incarnation needed to meet the resource demand requirement in view of a resource demand value provided by the incarnation.

5. The method of claim 4, wherein the assigning comprises sorting the number of replicas based upon a start time of the number of replicas.

6. The method of claim 5, wherein the assigning comprises assigning a first of the number of replicas to an open node; and
iteratively, for each of the remaining number of replicas, determining if a subsequent of the remaining number of replicas fits within the open node, assigning, responsive to determining that the subsequent of the remaining number of replicas fits within the open node, the subsequent of the remaining number of replicas to the open node, and assigning, responsive to determining that the subsequent of the remaining number of replicas does not fit within the open node, the subsequent of the remaining number of replicas to a next node.

7. The method of claim 1, wherein the total demand value is based upon a plurality of resource values and wherein each of the plurality of resource values is weighted within the total demand value.

8. The method of claim 1, wherein the assigning comprises identifying a plurality of node types, identifying, for each of the node types, a cost of assigning a given incarnation to a given node type, and assigning the given incarnation to a node type having a greatest effectiveness.

9. The method of claim 1, wherein the assigning comprises scheduling the incarnation for running on the at least one node.

10. The method of claim 1, wherein the resource comprises transactions per second.

11. An apparatus, comprising:
at least one processor; and
a computer readable storage medium having computer readable program code embodied therewith and executable by the at least one processor;
wherein the computer readable program code is configured to receive an application comprising a plurality of services to be hosted on a remote services environment;
wherein the computer readable program code is configured to obtain, for each of the plurality of services, a resource profile identifying a usage of a resource by a given service of the plurality of services over a period of time;

wherein the computer readable program code is configured to split, based upon the resource profile corresponding to a given service, the given service into a plurality of service slices, wherein the splitting comprises discretizing the resource profile and splitting the discretized resource profile into the plurality of service slices;

wherein the computer readable program code is configured to select, for each of the plurality of service slices, an incarnation of the resource services environment fulfilling a resource demand requirement and a service-performance-offering for a given of the plurality of service slices, wherein an incarnation has a total demand value based upon a resource capacity of a node at the remote services environment, wherein the selecting comprises identifying alternative incarnations fulfilling the resource demand requirement and the service-performance-offering and selecting one of the alternative incarnations based upon at least one attribute of the alternative incarnations; and wherein the computer readable program code is configured to assign, for each of the plurality of service slices the incarnation selected to at least one node within the remote services environment based upon the resource capacity of the at least one node.

12. A computer program product, comprising:

a computer readable storage medium having computer readable program code embodied therewith, the computer readable program code executable by a processor;

wherein the computer readable program code is configured to receive an application comprising a plurality of services to be hosted on a remote services environment;

wherein the computer readable program code is configured to obtain, for each of the plurality of services, a resource profile identifying a usage of a resource by a given service of the plurality of services over a period of time;

wherein the computer readable program code is configured to split, based upon the resource profile corresponding to a given service, the given service into a plurality of service slices, wherein the splitting comprises discretizing the resource profile and splitting the discretized resource profile into the plurality of service slices;

wherein the computer readable program code is configured to select, for each of the plurality of service slices, an incarnation of the resource services environment fulfilling a resource demand requirement and a service-performance-offering for a given of the plurality of service slices, wherein an incarnation has a total demand value based upon a resource capacity of a node at the remote services environment, wherein the selecting comprises identifying alternative incarnations fulfilling the resource demand requirement and the service-performance-offering and selecting one of the alternative incarnations based upon at least one attribute of the alternative incarnations; and wherein the computer readable program code is configured to assign, for each of the plurality of service slices the incarnation selected to at least one node within the remote services environment based upon the resource capacity of the at least one node.

13. The computer program product of claim 12, wherein the selecting comprises generating, for each of the plurality of service slices a plurality of possible incarnations, each of the plurality of possible incarnations fulfilling the resource demand requirement.

14. The computer program product of claim 13, wherein each of the plurality of possible incarnations has a corresponding total demand value and wherein the incarnation selected comprises an incarnation from the plurality of possible incarnations having a lowest total demand value.

15. The computer program product of claim 14, wherein the total demand value is based upon a number of replicas of the incarnation needed to meet the resource demand requirement in view of a resource demand value provided by the incarnation.

16. The computer program product of claim 15, wherein the assigning comprises sorting the number of replicas based upon a start time of the number of replicas.

17. The computer program product of claim 16, wherein the assigning comprises assigning a first of the number of replicas to an open node; and iteratively, for each of the remaining number of replicas, determining if a subsequent of the remaining number of replicas fits within the open node, assigning, responsive to determining that the subsequent of the remaining number of replicas fits within the open node, the subsequent of the remaining number of replicas to the open node, and assigning, responsive to determining that the subsequent of the remaining number of replicas does not fit within the open node, the subsequent of the remaining number of replicas to a next node.

18. The computer program product of claim 12, wherein the total demand value is based upon a plurality of resource values and wherein each of the plurality of resource values is weighted within the total demand value.

19. The computer program product of claim 12, wherein the assigning comprises identifying a plurality of node types, identifying, for each of the node types, a cost of assigning a given incarnation to a given node type, and assigning the given incarnation to a node type having a greatest effectiveness.

20. The computer program product of claim 12, wherein the assigning comprises scheduling the incarnation for running on the at least one node.

* * * * *